United States Patent [19]
Canada et al.

[11] Patent Number: 5,854,994
[45] Date of Patent: Dec. 29, 1998

[54] VIBRATION MONITOR AND TRANSMISSION SYSTEM

[75] Inventors: Ronald G. Canada; James W. Pearce; James C. Robinson, all of Knoxville, Tenn.

[73] Assignee: CSI Technology, Inc., Wilmington, Del.

[21] Appl. No.: 697,372

[22] Filed: Aug. 23, 1996

[51] Int. Cl.$^6$ .......................... H04Q 9/00; G08B 21/00; G06F 11/30

[52] U.S. Cl. .............................. 702/56; 702/34; 702/77; 702/105; 702/183; 702/182; 702/188; 364/138; 364/468.15; 364/474.17; 364/474.16; 364/474.11; 340/506; 340/679; 340/683; 340/825.06; 340/825.23; 340/870.09; 340/870.12; 340/870.16; 370/346; 370/442; 370/498; 370/501

[58] Field of Search .................................. 340/500, 501, 340/506, 517, 539, 531, 825.03–825.06, 825.23, 825.46, 825.71–825.73, 870.01, 870.06–870.09, 870.12, 870.16, 291, 292, 295, 299, 310.06, 425.1, 540; 375/206, 211, 214; 370/346–349, 442–444, 458, 461, 498, 501; 364/138, 468.15, 474.16, 474.11; 702/34, 56, 77, 81, 99, 104, 105, 113, 182, 183, 188

[56] References Cited

U.S. PATENT DOCUMENTS

| | | |
|---|---|---|
| 4,237,454 | 12/1980 | Meyer . |
| 4,470,141 | 9/1984 | Takada . |
| 4,722,226 | 2/1988 | Edmonds . |
| 4,744,242 | 5/1988 | Anderson et al. ........................ 73/104 |
| 4,766,432 | 8/1988 | Field .................................. 340/825.17 |
| 4,809,257 | 2/1989 | Gantenbein et al. ................... 359/136 |
| 4,831,558 | 5/1989 | Shoup et al. ........................... 364/550 |
| 4,831,785 | 5/1989 | Sigg . |
| 4,866,422 | 9/1989 | Dunnett et al. . |
| 4,887,266 | 12/1989 | Neve et al. . |
| 5,056,235 | 10/1991 | Thomas ..................................... 33/503 |
| 5,101,406 | 3/1992 | Messenger . |
| 5,121,243 | 6/1992 | Miyahira et al. ....................... 359/158 |
| 5,295,154 | 3/1994 | Meier et al. . |
| 5,309,351 | 5/1994 | McCain et al. ......................... 364/132 |
| 5,377,922 | 1/1995 | Fredriksson et al. . |
| 5,384,652 | 1/1995 | Allen et al. ............................. 359/172 |
| 5,408,506 | 4/1995 | Mincher et al. . |
| 5,433,111 | 7/1995 | Hershey et al. .......................... 73/593 |
| 5,438,329 | 8/1995 | Gastouniotis et al. . |
| 5,444,439 | 8/1995 | Kuroda et al. ...................... 340/825.07 |
| 5,488,631 | 1/1996 | Gold et al. . |
| 5,504,746 | 4/1996 | Meier . |
| 5,528,219 | 6/1996 | Frohlich et al. . |
| 5,602,757 | 2/1997 | Haseley et al. ........................... 702/56 |

FOREIGN PATENT DOCUMENTS

| | | |
|---|---|---|
| 5-191909 | 7/1993 | Japan . |
| 2197473 | 5/1988 | United Kingdom . |
| 2271691 | 4/1994 | United Kingdom . |

*Primary Examiner*—Emanuel Todd Voeltz
*Assistant Examiner*—Tuan Q. Dam
*Attorney, Agent, or Firm*—Luedeka, Neely & Graham, P.C.

[57] ABSTRACT

An apparatus is disclosed consisting of one or more machine monitors which attach to one or more machines to sense a physical characteristic of the machine, such as vibration or temperature, and produce wireless transmissions corresponding to the sensed characteristic, and a command station which receives the transmissions from the machine monitors and processes the information to give an indication of the condition of the machine. The machine monitor incorporates a wireless transmitter to transmit the sensor data, and the command station incorporates a wireless receiver to receive the sensor data. In the preferred embodiment of the invention, the machine monitors are not continuously on, but turn on only at preprogrammed times according to turn-on commands generated by a timer circuit within each machine monitor. In another preferred embodiment, each machine monitor includes a receiver and the command station includes a transmitter to enable the command station to send commands to each machine monitor. Each machine monitor includes a microcomputer to analyze the sensor data and a memory to store the analyzed sensor data prior to transmission to the command station. A repeater receives the sensor data transmissions from the machine monitors and retransmits the data to the command station when, due to site conditions, the machine monitors are beyond the receiving range of, or out of the line of sight to the command station.

42 Claims, 7 Drawing Sheets

VIBRATION MONITOR AND TRANSMISSION SYSTEM

TECHNICAL FIELD

The present invention relates to an apparatus for the nonintrusive monitoring of a physical characteristic associated with a machine. More particularly, it relates to an apparatus for transmitting a wireless signal representing the monitored machine characteristic from a sensor on the machine to a remote monitoring station.

BACKGROUND

Many manufacturing processes require complex industrial machines utilizing rotating or reciprocating elements. The efficient operation and maintenance of these machines is essential to maximizing production and minimizing downtime. When a rotating machine element acquires a defect, that defect is seldom catastrophic at onset. Instead, the defect is usually of a latent or incipient nature, such as a hairline fracture in the tooth of a gear. Notwithstanding a probable reduction in the efficiency of the machine, if such a fault is not detected, isolated, and repaired, it could grow into a catastrophic failure of the machine with resultant loss of production capacity of the machine and possible injury to personnel. Unfortunately, due to the noise generated by these machines and the acoustic environment in which they normally operate, it is often difficult if not impossible to detect latent or even incipient defects in rotating elements of the machine by visual or aural inspection. Further complicating the detection of such faults is that faulty components may be hidden from view, such as a single gear in an enclosed gearbox.

It is desirable to detect and locate faults while the machine is operating in its normal environment so as not to interfere with the production process. Taking the machine off line to perform preventative maintenance creates an undesirable and inefficient situation, requiring a back-up or redundant machine in order to prevent a shutdown of the production process.

Nonintrusive fault detection may be accomplished by monitoring certain physical characteristics of the machine, such as vibration and temperature levels, using electrical sensors such as accelerometers and temperature sensors. These sensors are typically connected by means of at least one pair of wires per sensor to a monitoring device. The monitoring device processes the sensor signals and produces an output signal which is indicative of the operational health of the machine. Such fault detection devices provide an early indication of machine problems, typically before a catastrophic failure occurs.

One problem associated with wired fault detection systems is the high cost of installation in a typical manufacturing plant. A typical machine may require four to eight vibration sensors mounted at various locations on the machine, and there may be from several dozen to several hundred machines in a typical plant. It is desirable to monitor all of the machines from a central location in the plant, so that manufacturing personnel need not travel to each machine in the plant to assess its health. The installation of wire and conduits to connect each sensor to a central monitoring station could be cost prohibitive.

In addition to the high cost, wired systems tend to be fragile, primarily due to the wiring. Wires and connectors can easily become contaminated with water or other materials common in dirty industrial environments, resulting in anomalous signals. Wires are also easily damaged, especially near the connectors, during normal machine maintenance procedures. Such damage is usually manifested as intermittent anomalous signals, which make isolation, diagnosis, and correction of the problem quite difficult.

Another problem with a wired machine monitoring system is the inflexibility of the installation. It is difficult to change the configuration of the system as needs change within the manufacturing plant. If a plant operator decides that more sensors should be added to a machine, or that the location of the machine or sensors should be changed, the cost of installation of additional wiring and conduits must be incurred.

Since the major problems associated with wired machine monitoring systems are caused by the presence of the wires, a need exists for a wireless machine monitoring system.

SUMMARY

The present invention is directed to an apparatus that satisfies the need for a wireless system for monitoring the health of a plurality of machines, such as in a manufacturing plant. The apparatus consists of a plurality of machine monitors mounted on a plurality of machine measuring points. Each machine monitor includes at least one sensor to sense a characteristic of the machine at the machine measuring point and generate at least one sensor signal corresponding to the characteristic that is sensed. Each machine monitor also includes a data processor for receiving and analyzing the sensor signals, for producing analyzed signals based on the sensor signals, and for producing selected data based on the analyzed sensor signals. Each machine monitor contains a transmitter which produces wireless transmission signals corresponding to the sensor signals. The apparatus also includes a command station with a receiver for receiving the transmission signals from the machine monitors. The command station stores data corresponding to the received signals which are representative of the sensed characteristic of the machine. In this manner, an operating condition of the plurality of machines at the plurality of measuring points is sensed and stored at the command station.

The preferred embodiment of the invention also includes a memory in the machine monitor for storing data corresponding to the sensor signals and for producing stored data signals corresponding to the stored data. The stored data signals are transferred from the memory to the transmitter which produces wireless transmission signals corresponding to the stored data signals.

To conserve power, a timer in the machine monitor energizes and de-energizes the sensor, data processor, and transmitter at selected times.

In another preferred embodiment, the machine monitor also includes a wireless receiver, and the command station also includes a wireless transmitter. The machine monitor receives wireless commands from the command station through the wireless receiver, and is responsive to the commands to control the operation of the machine monitor.

The preferred embodiment of the wireless machine monitoring apparatus also includes a wireless repeater for receiving wireless transmission signals from the machine monitor or the command station, and re-transmitting wireless transmission signals for receipt by the command station or the machine monitor, respectively. This is useful in those situations where the wireless transmission signals from the machine monitor or the command station are attenuated due to distance or due to blockage caused by intervening structures.

The machine monitor of the preferred embodiment of the invention incorporates an analog to digital converter for producing digital data corresponding to the sensor signals. The machine monitor data processor of this embodiment is a digital data processor, and the machine monitor transmitter is capable of producing wireless transmission signals corresponding to the digital data signals. The machine monitor transmitter and the command station receiver are capable of transmitting and receiving a digital signal with an error checking protocol.

The transmitters and receivers of the preferred embodiment are spread spectrum radio frequency (RF) transmitters and receivers, each using a spread spectrum communication protocol to avoid interference caused by noise and other nearby RF emitters. The transmitters and receivers of an alternative embodiment communicate by means of light waves, such as infrared.

An identification system is incorporated into the machine monitor of the preferred embodiment for storing and generating a unique identification code for the machine monitor. This identification code is transmitted as part of the wireless transmission signals. The command station is responsive to the identification code to positively identify which machine monitor transmitted a particular received wireless transmission signal.

The machine monitor further comprises a housing which is relatively small, such as two inches by two inches by three inches, which can be mounted unobtrusively on machines. The machine monitor includes a means for attaching the housing to the machine, and a battery which is small enough to fit within the housing and which has sufficient capacity to power the components of the machine monitor for about a year.

The machine monitor data processor receives and analyzes the sensor signals, produces analyzed signals, compares the analyzed signals to predetermined criteria, and determines an alarm condition based on the comparison. When the data processor determines that an alarm condition exists, the data processor produces a turn-on signal, alarm data, and an alarm transmit signal. The machine monitor transmitter powers on in response to the turn-on signal, and transmits a wireless signal corresponding to the alarm data in response to the alarm transmit signal.

The alarm data transmissions from each machine monitor transmitter are different from transmission signals produced by other machine monitor transmitters so that interference is avoided. Such transmissions are produced in a different frequency range, at different times, or using different spread spectrum codes from other machine monitor transmissions.

In the machine monitor of the preferred embodiment, the data processor is a microcomputer which receives and analyzes the sensor signals, produces frequency domain data corresponding to the sensor signals, compares the frequency domain data to predetermined criteria, and produces an alarm condition based on the comparison. The microcomputer performs a Fourier transform on the sensor signals to produce the frequency domain data in the form of a frequency spectrum. The microcomputer is also capable of producing time wave form data corresponding to the sensor signals, and comparing the time wave form data to predetermined criteria to determine whether an alarm condition exists.

In another preferred embodiment of the present invention, a monitoring system is disclosed for monitoring a machine in a plant. The monitoring system consists of a monitor and a command station. The monitor includes at least one sensor for sensing a physical characteristic of the machine at a machine measuring point and generating at least one analog sensor signal corresponding to the physical characteristic that was sensed. The monitor also includes an analog to digital converter for producing digital sensor signals corresponding to the analog sensor signals, and a monitor computer for receiving the digital sensor signals, analyzing the digital sensor signals, producing data corresponding to the sensor signals, and producing control commands. The monitor contains a wireless transmitter responsive to the control commands for receiving the data and producing wireless transmission signals corresponding to the data. The monitor incorporates a monitor receiver for receiving wireless signals and producing the received signals for transfer to the monitor computer. The monitor includes a power supply to provide power to the active monitor elements and a housing to enclose at least some of the monitor elements. The housing has means to attach the machine monitor to the machine at the machine measuring point.

The command station of the monitor system includes a command station computer for producing commands and receiving, storing, and producing data. The command station also includes a command station receiver for receiving and transferring the monitor wireless transmission signals and transferring data corresponding to the received signals to the command station computer. The command station incorporates a command station transmitter for receiving data and commands from the command station computer, and for transmitting command wireless signals corresponding to the data and commands received from the command station computer.

The command station of this preferred embodiment produces and transmits scheduling commands corresponding to the time of day that the monitor transmitter should turn on and transmit data. At the designated times, the monitor receiver turns on, receives the scheduling commands, and transfers them to the monitor computer which responds to the scheduling commands by issuing turn-on signals at selected times corresponding to the scheduling commands. The monitor transmitter responds to the turn-on signals to power on and, under control of the monitor computer, produces wireless transmission signals. The monitor receiver is also responsive to the turn-on signals to power on and, under control of the monitor computer, receive wireless signals from the command station. The monitor receiver transfers the data received from the command station to the monitor computer for execution.

BRIEF DESCRIPTION OF THE DRAWINGS

The preferred embodiments of the invention will now be described in further detail. Other features, aspects, and advantages of the present invention will become better understood with regard to the following description, appended claims, and accompanying drawings where:

DETAILED DESCRIPTION OF PREFERRED EMBODIMENTS

Figure 1:
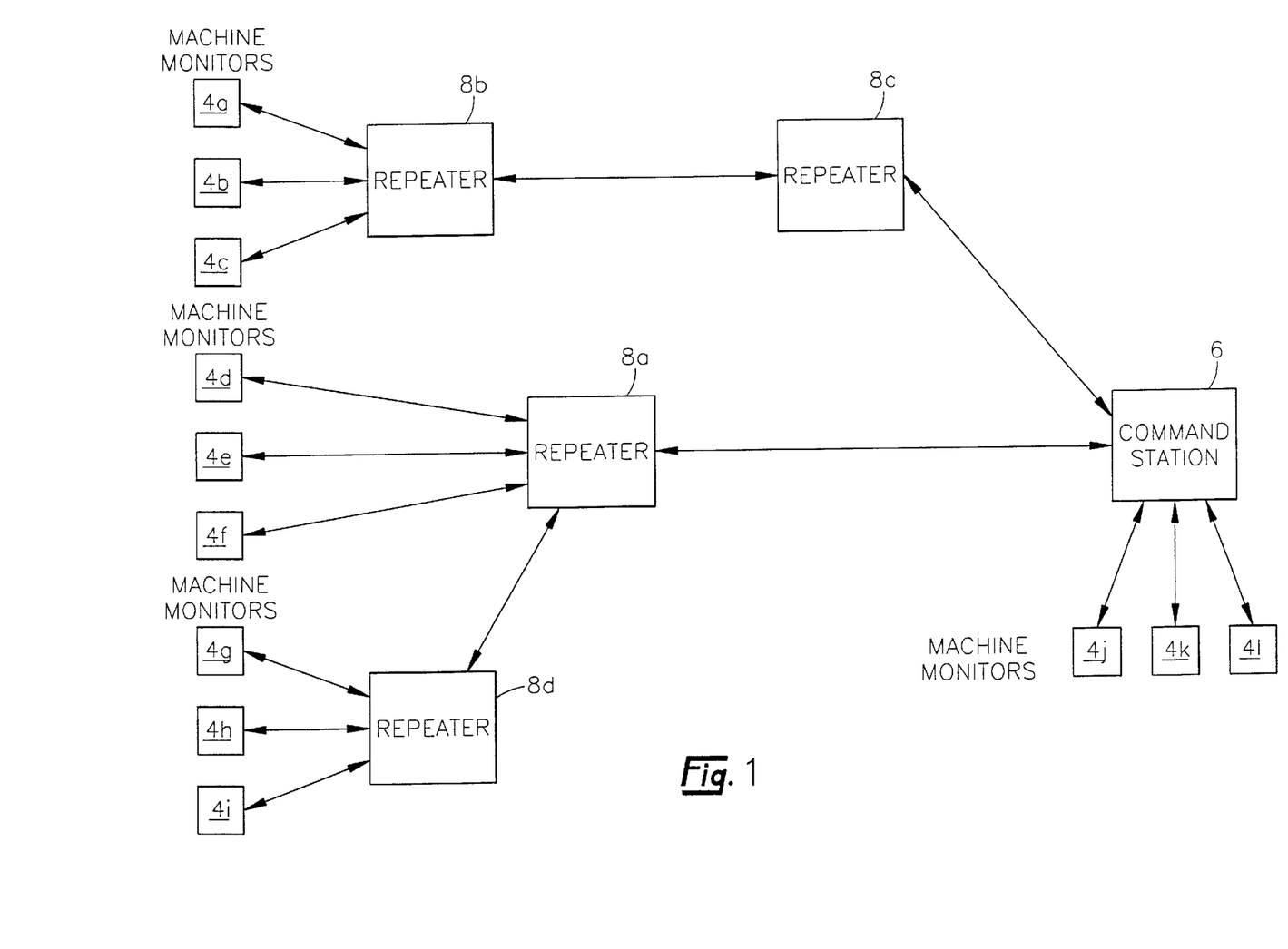
FIG. 1 shows a block diagram of a preferred embodiment of the invention.

Shown in FIG. 1 is a block diagram of the preferred embodiment of the invention. The system shown in FIG. 1 is used when it is desirable to remotely monitor certain machine characteristics, but it is undesirable to install wiring between a remote monitoring station and a sensor on the machine. The system consists of: (1) one or more machine monitors 4 which are placed in various locations on, or in, one or more machines and which transmit signals representative of characteristics of the machine, such as vibration or temperature, (2) a command station 6 which receives the signals transmitted from the machine monitors 4 and formats the data as desired by an operator, and (3) one or more repeaters 8 which aid in communication between the machine monitors 4 and the command station 6 when site conditions make such aid necessary.

The basic components of the system may be configured in various ways, some of which are illustrated in FIG. 1, to meet the requirements of the particular location where the system is used. If a particular machine is located such that machine monitors 4 placed on the machine are beyond the receiving range of the command station 6, or are out of the line of sight to the command station 6, a properly located repeater 8 is used to receive the signals from the machine monitors 4 and retransmit the signals to the command station 6. In some situations, more than one repeater 8 is necessary to provide for communication between the machine monitors 4 and the command station 6. In other situations, direct communication between the command station 6 and the machine monitors 4 is possible without the use of a repeater 8.

Figure 2:
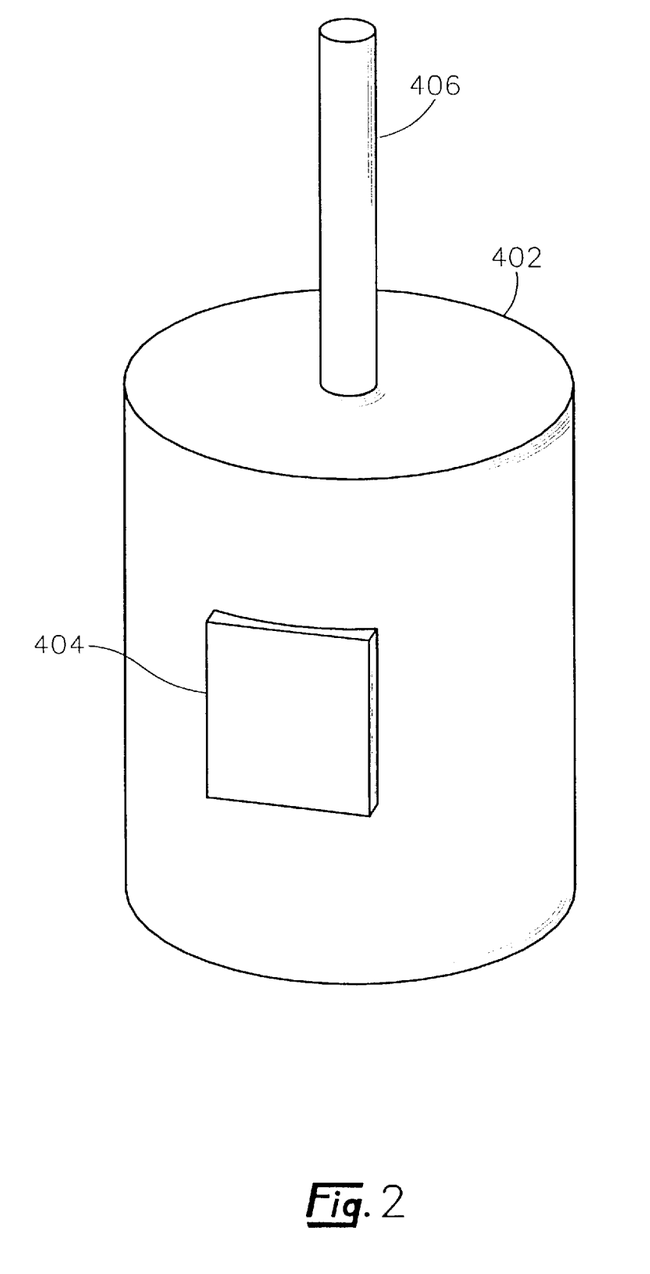
FIG. 2 is a drawing of the machine monitor element of a preferred embodiment of the invention.

As shown in FIG. 2, the machine monitor 4 of FIG. 1 is contained in a compact housing 402, such as a two-inch diameter by three-inch long cylinder with self-contained attachment means 404, such as a magnetic mount, so that the monitor may be easily attached to the machine even in cramped locations. An antenna 406 is integrated with the housing of the preferred embodiment, such as shown in FIG. 2.

Figure 3:
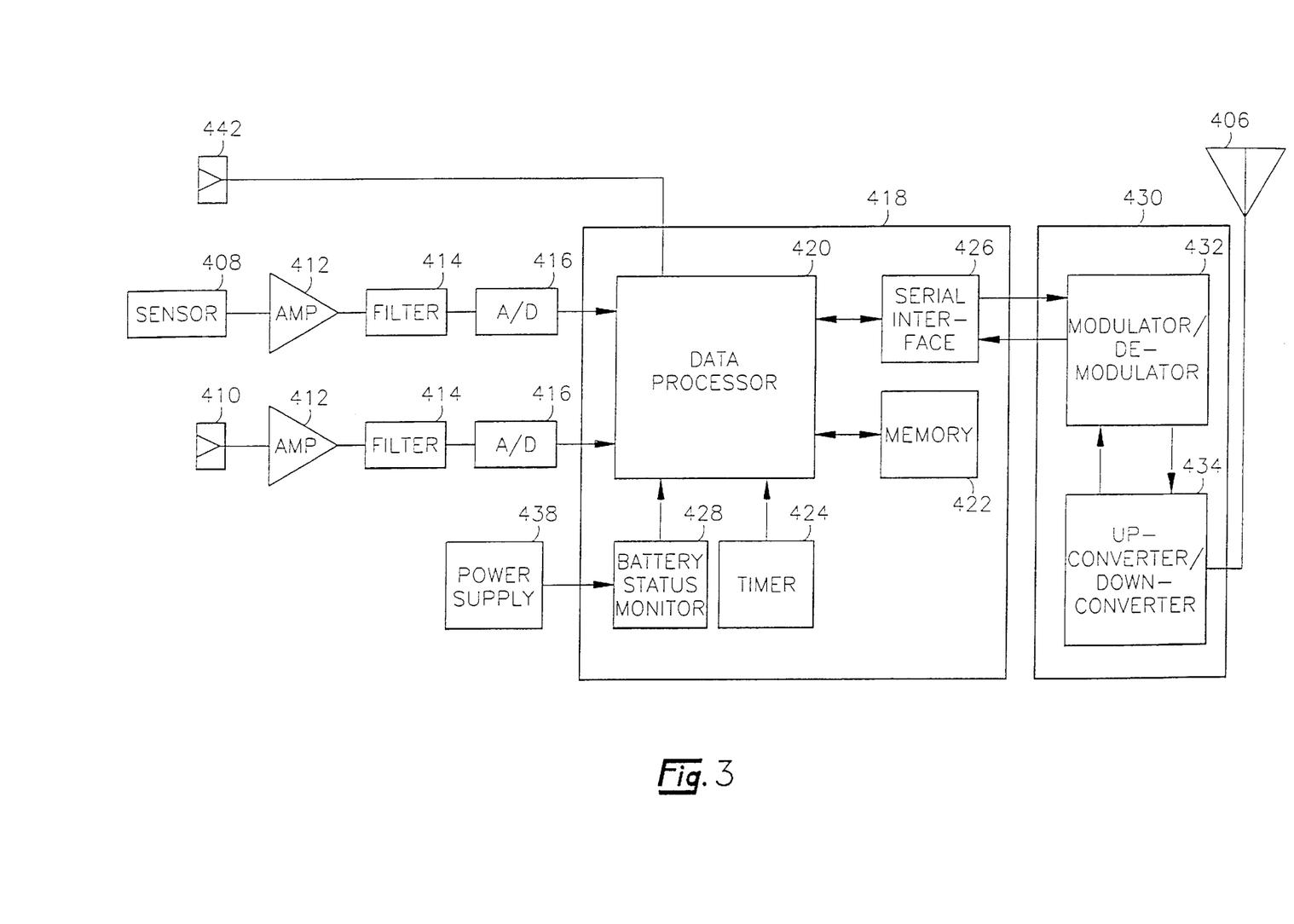
FIG. 3 shows a block diagram of the machine monitor element of a preferred embodiment of the invention.

In FIG. 3, a functional block diagram of the machine monitor 4 of FIG. 1 is shown. Each machine monitor 4 contains at least one sensor 408 which is integrated with the machine monitor housing in such a manner that the desired machine characteristic is accurately measured when the machine monitor housing is fastened to the machine. The machine monitor 4 has connectors 410 so that one or more remote sensors 408 may be interfaced with the data processing and transmission circuitry of the machine monitor 4. In this manner, the characteristics of interest may be measured at several locations on the machine while transmitting the measured data from only one machine monitor 4. The integrated and remote sensors 408 are devices such as small, low-power, low-cost accelerometers, and instantaneous turn-on solid-state temperature sensors. The accelerometers, such as the type number 353B18, have an accuracy of ±5% from 1 to 10000 Hz and ±3 dB up to 30 kHz, and a turn-on settling time of less than five second. The temperature sensors, such as the type number LM60, have an accuracy of ±2° C. over a 0° to 80° C. temperature range.

The sensor signals are amplified by an amplifier 412, such as a digitally-controlled variable gain amplifier incorporating a chip of type number LM6684. The sensor signals are filtered to eliminate aliasing by means of an anti-aliasing filter 414, such as a simple resistor-capacitor (RC) low-pass filter or a two-pole Sallen-Key active filter, and are then converted into digital format by an analog-to-digital converter 416, such as a 16-bit Sigma-Delta converter of type number CS5330.

The digital sensor signals are fed to a monitor computer 418, such as the Toshiba TMP93CM41 microcomputer. Examples of circuits incorporating this microcomputer are detailed in the Toshiba 16-Bit Microcontroller TLCS-900/L MCU Series (2) Data Book (March 1995). The monitor computer 418 includes a data processor 420 which performs 16-bit operations with 32-bit extended registers. The monitor computer 418 also incorporates a memory 422 consisting of at least 32 kilobytes of static RAM, a timer 424, a serial interface 426, and a battery status monitor circuit 428.

In the preferred embodiment of the invention, the sensors 408 are not continuously on, but are turned on at intervals which have been programmed into the monitor computer 418. The duration of the measurement interval, during which the sensors 408 are on, is three seconds, just long enough for the sensors 408 to settle and take a measurement. The frequency of the measurement interval, selectable by the operator, is typically on the order of one per every twelve hours, thus minimizing battery drain and extending battery life.

To conserve power, most of the time the monitor computer 418 stays in a standby mode requiring less than 100 $\mu$A of current, and enters an operational state only at scheduled times. At these scheduled times, a message from the timer 424, the monitor computer's only active component while in standby mode, causes the data processor 420 to enter an operational mode and begin processing data from the sensors. The data processing tasks include such functions as (1) production of time wave form vibration data corresponding to the sensor signals, (2) calculation of fast Fourier transforms (FFT's) on the time-domain sensor data to produce frequency-domain data, (3) comparison of the analyzed sensor data to preprogrammed threshold criteria, and (4) production of an alarm message if the threshold criteria is exceeded. Depending on its preprogrammed instructions, the data processor 420 either sends the processed data over the serial interface 426 to be immediately transmitted, or stores the data in memory 422 for transmission at a later scheduled time.

To further conserve power, the monitor 4 transmits the data only during preprogrammed intervals, the timing of the intervals provided by the timer 424. These transmit intervals either coincide with the measurement intervals of the sensors 408 such that real-time sensor data is transmitted, or the transmit intervals are scheduled such that data previously stored in the machine monitor memory 422 is transmitted. Transmission scheduling is controlled by the operator according to instructions programmed into the monitor computer 418.

In the preferred embodiment of the invention, the data is transmitted from the machine monitor 4 to the command station 6 in a spread spectrum format. In this scheme, a radio-frequency (RF) signal is modulated using a digital coding sequence which spreads the signal energy over a fairly broad bandwidth, thereby making the signal resistant to interference from other nearby RF emitters.

As shown in FIG. 3, the preferred embodiment incorporates a radio frequency (RF) transceiver 430 which performs data transmission as well as data reception. The transceiver 430 of this preferred embodiment further consists of a modulator/demodulator circuit 432, such as the Stanford Telecommunications STEL-2000A spread spectrum processor, which, in the transmit mode, modulates an intermediate frequency (IF) signal with the baseband digital sensor data. The IF signal is fed to an up-converter/down-converter circuit 434, such as the TriQuint FC0506BB, which converts the IF signal into an RF signal to be transmitted from the antenna 406.

The transceiver 430 of the preferred embodiment also provides for receiving and decoding messages from the command station 6 which are transmitted to the machine monitor 4 in the form of RF signals. Such messages include: (1) timing messages which synchronize the machine monitor timer 424 to the command station computer's clock, (2) scheduling messages which tell the machine monitor 4 when to measure, analyze, and transmit the sensor data and when to receive other messages from the command station 6, (3) confirmation messages which tell the machine monitor 4 that the command station 6 has accurately received the sensor data transmissions, (4) special request messages which command the machine monitor 4 to perform special data analysis functions, and (5) reprogramming messages which provide new programming for the monitor computer 418. The RF signals from the command station 6 are received by the antenna 406, down-converted to IF by the up-converter/down-converter circuit 434, demodulated by the modulator/demodulator circuit 432 to form baseband data signals, and fed over the serial interface 426 to the data processor 420.

The receive circuits of the machine monitor transceiver 430 are not continuously on, but, to conserve power, are turned on only when necessary to receive messages from the command station 6. The "on time" of the receive circuits is scheduled by the operator according to instructions programmed into the monitor computer 418. At the scheduled times, a message from the timer 424 causes the monitor computer 418 to send power-on messages to the receive circuits of the monitor transceiver 430. The receive circuits stay energized until an error-free message is received from the command station 6, at which time the monitor computer 418 sends a shut-down message to the receive circuits of the monitor transceiver 430.

With continued reference to FIG. 3, a power supply 438, such as a replaceable "D-cell" flashlight battery provides the voltage necessary for the functioning of the active elements of the machine monitor 4. Under normal operational conditions, such a battery will provide power for the machine monitor 4 for at least one year. The power supply 438 may alternatively consist of a rechargeable battery, such as a nickel-cadmium cell, and a charging voltage source, such as a solar cell or a wire coil moving across a magnetic field produced by the machine on which the machine monitor 4 is attached. The battery voltage is monitored by a battery status monitor circuit 428 which provides a battery status message to the monitor computer 418. The monitor computer 418 is programmed to transmit this battery status message to the command station 6 as part of a regularly scheduled sensor data message, and to transmit a battery status alert message when the battery voltage falls below a programmed threshold level.

Figure 4:
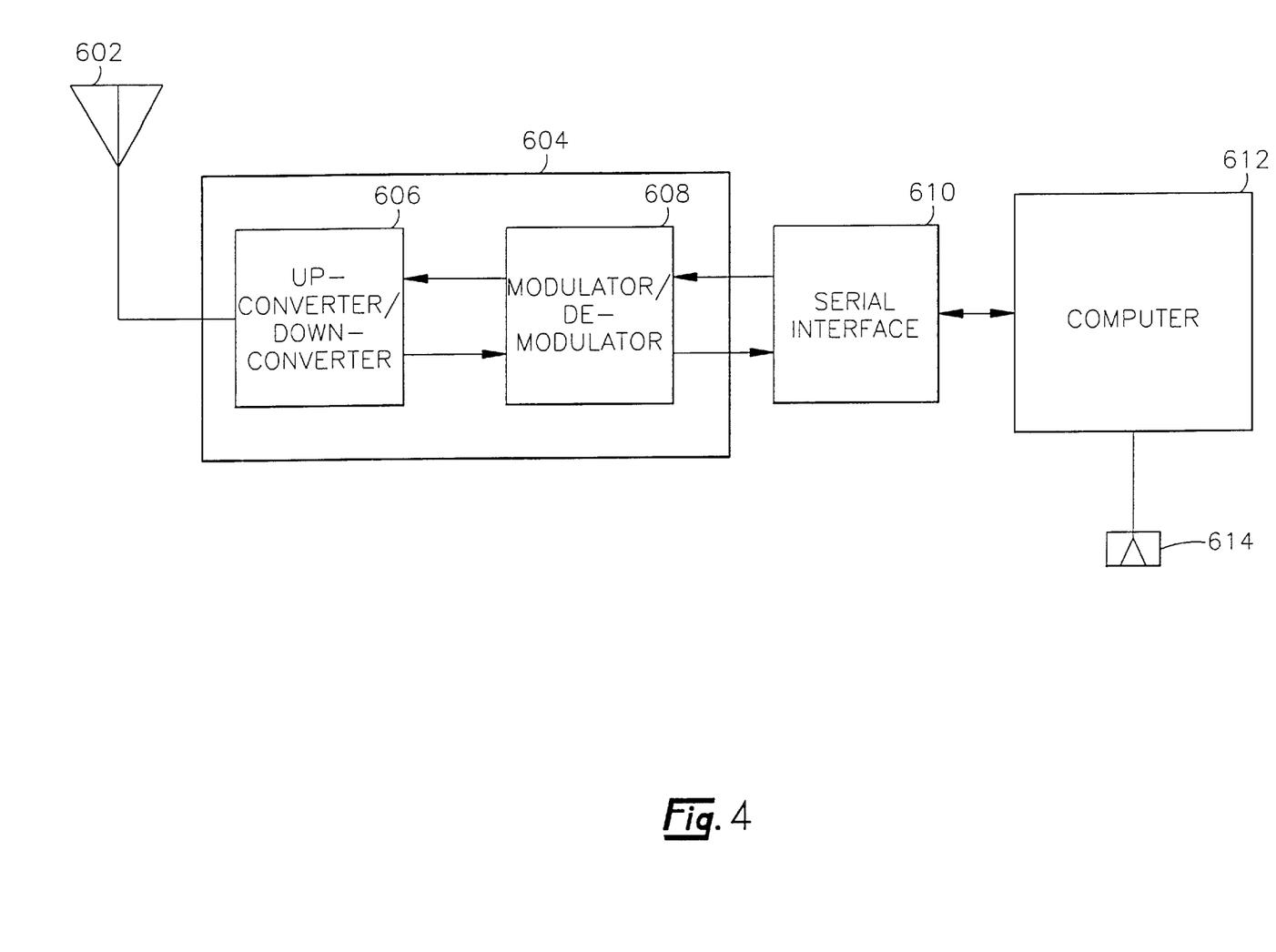
FIG. 4 shows a block diagram of the command station element of a preferred embodiment of the invention.

A block diagram of the preferred embodiment of the command station 6 of FIG. 1 is shown in FIG. 4. The RF signal transmitted from the machine monitor 4 is received by an antenna 602 at the command station 6. A transceiver 604, which includes an up-converter/down-converter circuit 606 and a modulator/demodulator circuit 608, such as those previously discussed in the description of the machine monitor 4, downconverts and demodulates the RF signal to recover the digital sensor data. The sensor data is fed over a serial interface 610 to a command station computer 612, such as a personal computer incorporating a Pentium processor or equivalent, where the information is monitored in real-time for machine fault conditions and is entered into a data base for off-line trend analysis. The transmit circuits of the command station transceiver 604, provide for the transmission of timing, scheduling, and programming messages to the machine monitor 4.

Figure 5:
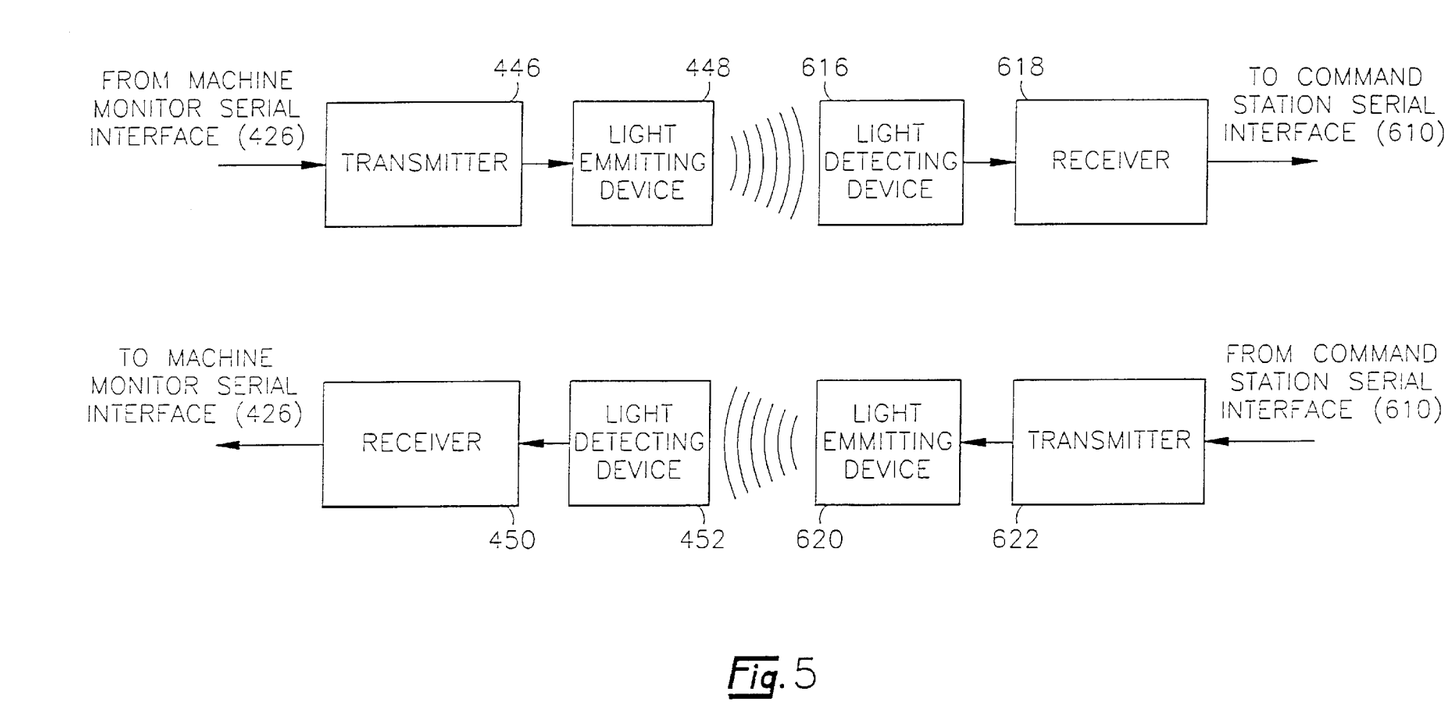
FIG. 5 shows a block diagram of the transmit and receive sections of the machine monitor and the command station of an alternative embodiment of the invention.

In an alternative embodiment of the invention, the machine monitor 4 communicates with the command station 6 by means of light waves. As shown in FIG. 5, the machine monitor transmitter 446 of this embodiment receives digital sensor data from the machine monitor serial interface 426 and modulates an electrical signal which drives a light emitting device 448, such as a light emitting diode (LED). The light emitting device 448 converts the electrical signal from the transmitter 446 into light waves which are modulated with the digital sensor information. At the command station 6 of this embodiment, a light detecting device 616, such as a photodiode, receives the light waves from the light emitting device 448 of the machine monitor 4 and converts the light waves into an electrical signal. With continued reference to FIG. 5, the command station receiver 618 amplifies and demodulates the electrical signal at the output of the light detecting device 616 to form a digital electrical signal which is compatible with the data format of the command station serial interface 610. The sensor data is then passed over the serial interface 610 to the command station computer 612 for processing as described above. A similar series of operations are performed to transmit messages from the command station 6 to the machine monitor 4 as shown in FIG. 5.

The preferred embodiment of the invention provides for error detection in the data that the command station 6 receives from the machine monitor 4. With the preferred error detection scheme, the machine monitor 4 transmits a 16-bit cyclic redundancy check (CRC16) message immediately after transmitting the sensor data message. Upon receipt of the sensor data message and the CRC16 message, the command station 6 computes its own CRC16 message based on the received data and compares it to the received CRC16 message. If the received and computed CRC16 messages match, then no errors exist in the received sensor data, and the command station 6 transmits an acknowledgment message to the machine monitor 4 to confirm that the sensor data has been accurately received.

To preclude the possibility of a transmission from one machine monitor 4 interfering with a transmission from another machine monitor 4, data transmission times for each machine monitor 4 are scheduled such that only one machine monitor 4 is transmitting at any given time (time division multiplexing). By accurate synchronization of the machine monitor timer 424 with the command station clock, the command station 6 "listens" for the transmission of only one machine monitor 4 at the precise time when the command station 6 has commanded the machine monitor 4 to transmit.

To enable the command station 6 to verify which machine monitor 4 is transmitting a data message, each machine monitor 4 transmits a unique identification code prior to the sensor data message. The identification code combined with the sensor data message comprise a data packet. The identification code is stored within the machine monitor 4 by means such as a set of DIP switches or a non-volatile RAM, the state of which determines the value of the identification code to be stored in the monitor computer memory. The identification code transmitted by the machine monitor 4 is received by the command station 6, and the command station computer 612 compares the code to values stored in a table within the command station computer 612.

In an alternative embodiment of the invention, the possibility of interference is reduced further by programming each machine monitor 4 to transmit with its own distinct spread spectrum pseudo-noise (PN) code (code division multiplexing). The command station 6 then listens for a particular code assigned to a particular machine monitor 4 at the designated transmission time.

Another alternative embodiment of the invention utilizes frequency multiplexing to preclude interference between transmissions from multiple machine monitors 4. In this embodiment, each machine monitor transceiver 430 is assigned a unique frequency band over which to transmit the sensor data to the command station 6. The command station transceiver 604, as commanded by the command station computer 612, listens for a particular machine monitor 4 on the assigned frequency band at the designated transmission time.

While the preferred embodiment of the invention transmits a signal from the machine monitor 4 to the command station 6 only at scheduled times, it is contemplated that the machine monitor 4 could also incorporate means of continuously sensing an extreme fault condition of the machine being monitored, such as the use of tuned reed switches for detecting an extreme vibration condition. When such an extreme fault condition occurs, the monitor computer 418 "wakes up" from the standby mode, processes the signal from its one or more sensors 408, and transmits a data packet consisting of the machine monitor's identification code and the sensor data to the command station 6. To avoid interference with regularly scheduled data messages, these fault messages are transmitted only during special time intervals which are individually assigned to each machine monitor 4 specifically for the transmission of fault messages. Between the time intervals scheduled for "regular" sensor data transmissions, the command station 6 listens for fault messages from the machine monitors 4. Depending on the number of machine monitors 4 under the control of a particular command station 6, several such fault message intervals are available to each machine monitor 4 between the scheduled intervals for "regular" sensor data transmissions.

Figure 6:
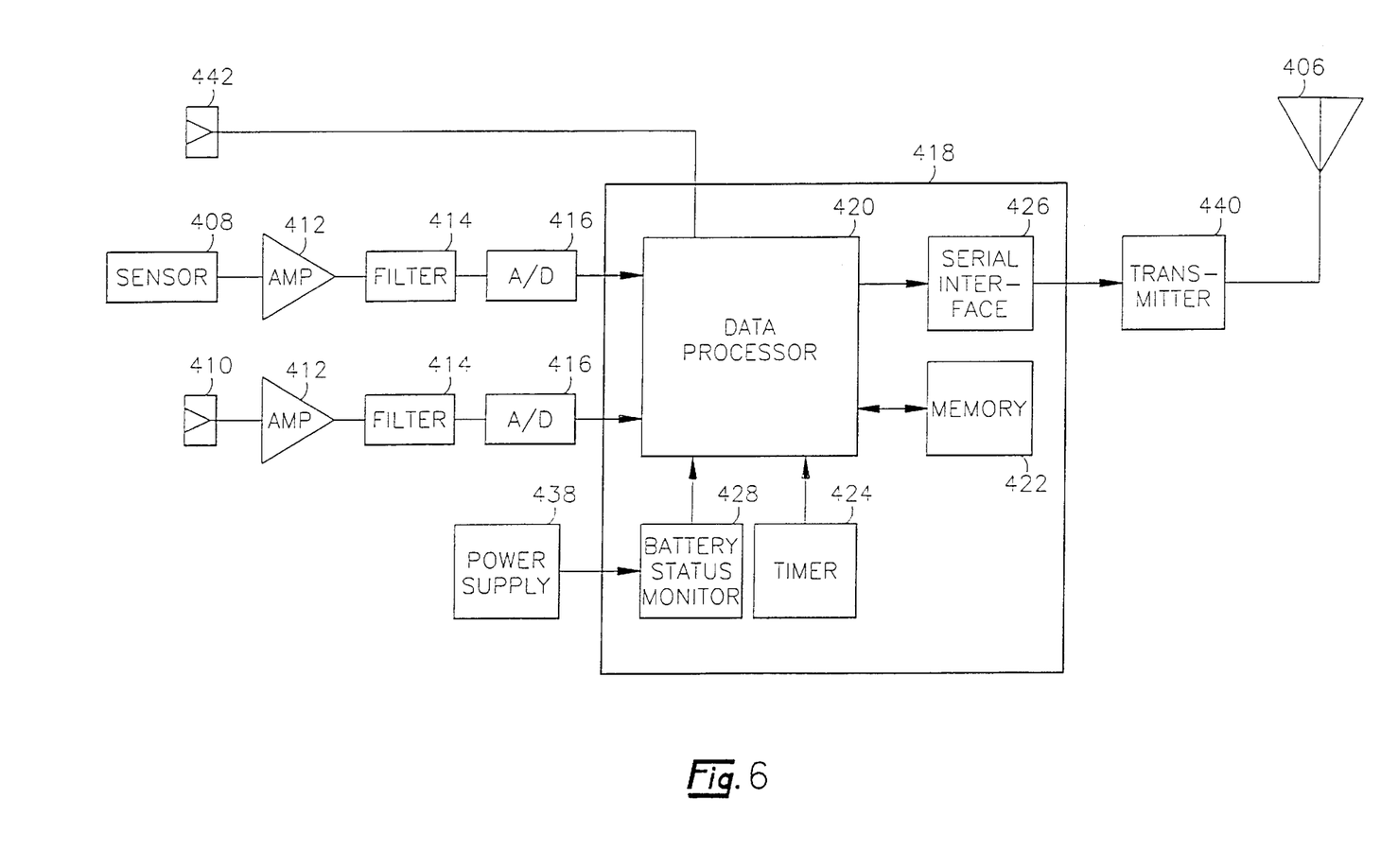
FIG. 6 shows a block diagram of the machine monitor element of an alternative embodiment of the invention.

Although the machine monitor of the preferred embodiment of the invention includes means for receiving messages from the command station 6, the central function of the invention, the remote monitoring and analysis of machine characteristics, can be accomplished without a receiving means included in the machine monitor 4. FIG. 6 is a block diagram of a receiverless machine monitor 4 of an alternative embodiment of the invention. This embodiment includes a transmitter 440, not a transceiver. Instead of receiving wireless messages from the command station 6 to set the machine monitor's start-up and shut-down times, these times are programmed into the monitor computer memory 422 via an interface cable prior to installation of the machine monitor 4 in the machine. During programming, the interface cable is connected between the monitor computer 418 and the command station computer 612, utilizing interface connectors 442 and 614 in the machine monitor 4 and the command station 6, respectively. Synchronization of the machine monitor's timer 424 with the command station's clock is also accomplished via the cable interface. In this alternative embodiment, the data analysis function to be performed by the machine monitor 4 is likewise programmed into the machine monitor computer 418 via the cable interface prior to installation of the machine monitor 4 in the machine to be monitored. Once programming and timing calibration are complete, the interface cable is removed and the machine monitor 4 is attached to the machine.

While the machine monitor 4 of the preferred embodiment is battery powered to accommodate a completely wireless installation in the machine to be monitored, a second alternative embodiment of the invention is useful in those situations which require continuous monitoring of a machine characteristic, and a continuous source of power is available at the machine location. This alternative embodiment incorporates a power conditioner circuit so that the machine monitor 4 may be connected to the AC power source at the machine site. The power conditioner converts the AC source voltage to the appropriate level of DC voltage for each component of the machine monitor 4 and filters the source voltage to remove noise generated on the AC line by nearby machinery.

Figure 7:
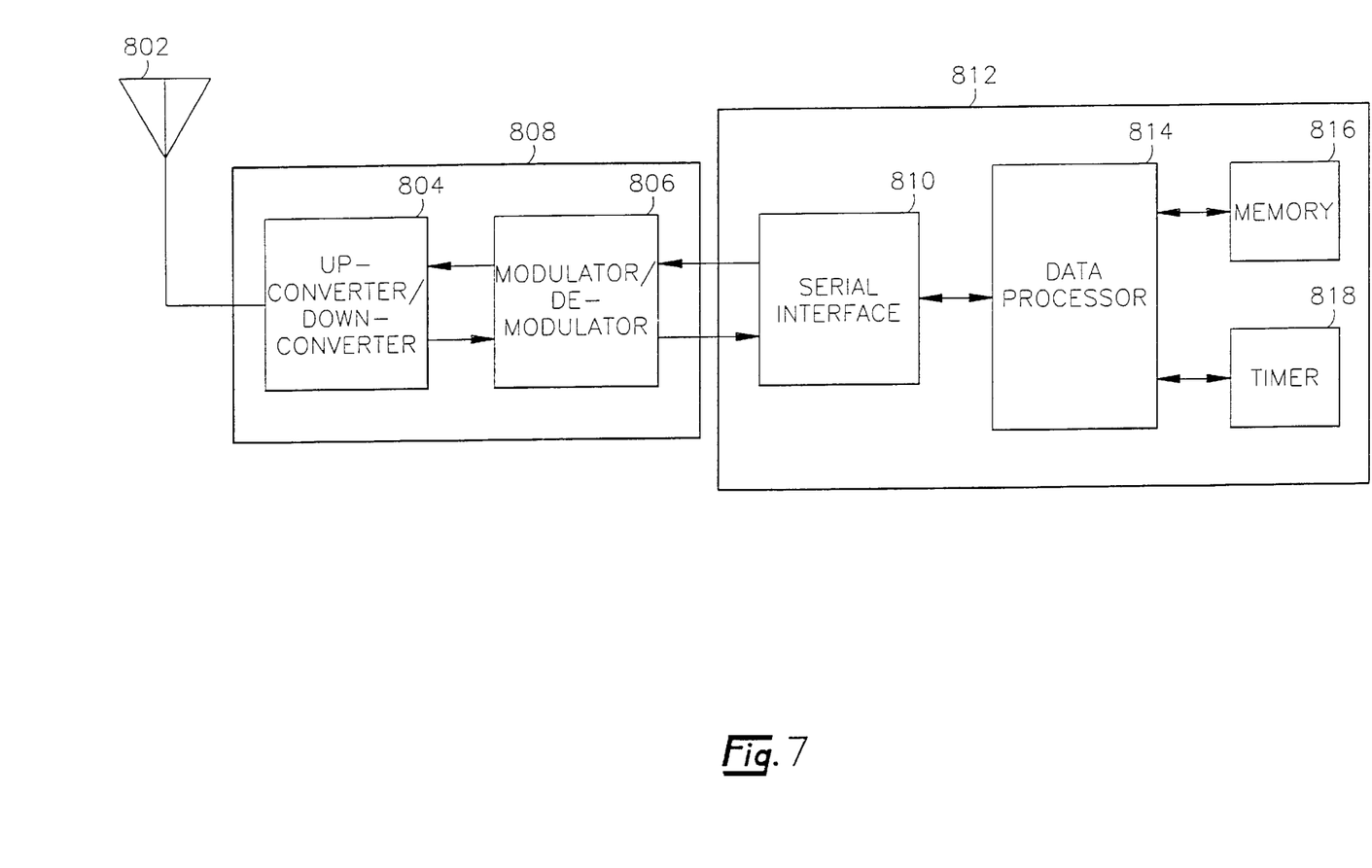
FIG. 7 shows a block diagram of the repeater element of a preferred embodiment of the invention.

The repeater 8 of FIG. 1 is shown in block diagram form in FIG. 7. The RF sensor data message from a machine monitor 4 is received by the antenna 802, converted down to IF by the up-converter/down-converter circuit 804, and demodulated by the modulator/demodulator circuit 806 to recover the original baseband sensor data. The sensor data is then passed over the serial interface 810 of the repeater computer 812 to the data processor 814. The sensor data is then either stored in memory 816 or is passed to the modulator/demodulator circuit 806 and the up-converter/down-converter circuit 804 of the repeater transceiver 808 to create a "new" RF sensor data signal. This signal is transmitted from the repeater antenna 802 to the command station 6. The repeater 8 operates in a similar fashion when relaying data from the command station 6 to the machine monitors 4.

A timer 818 provides the clock signals necessary for proper timing of the receive and transmit intervals for each machine monitor 4 assigned to the repeater 8. The repeater computer 812 sets up the transceiver 808 with the correct spread-spectrum PN code for the particular machine monitor 4 that the repeater 8 is servicing at any given time.

The repeater's transceiver 808 and computer 812 are of the same type as, or are functionally equivalent to, the corresponding components of the machine monitor 4. In the preferred embodiment, the operation of the repeater 8 is "transparent" to the other components of the system, that is, the other components function in the same manner as they would if the repeater 8 were unnecessary and not in the system.

Since a repeater 8 is designed to service many machine monitors 4, a repeater 8 must be operable at a higher duty cycle than that of a single machine monitor 4. For this reason, the repeater 8 of the preferred embodiment is powered by a continuous power source such as a standard AC power outlet. The location of a repeater 8 is flexible enough to allow the repeater 8 to be near an AC power outlet while still adequately servicing the machine monitors 4. Continuous operation allows the repeater 8 to be continuously "listening" for fault messages from the machine monitors 4 which the repeater 8 services.

In operation, the preferred embodiment of the invention is used to monitor physical characteristics, such as vibration, temperature, and pressure, of machines and processes, such as those in a manufacturing plant. The following description provides an example of a typical sequence of events during the operation of the preferred embodiment of the invention.

Other operational modes are anticipated, such as those mentioned in the previous descriptions of other preferred embodiments.

Prior to use, the machine monitors 4 are programmed with identification codes unique to each monitor and with the microprocessor instructions which define the machine monitor's operation. Such initial programming is carried out by means of an interface cable which connects the machine monitor computer 418 with the command station computer 612. After programming, the machine monitors 4 are attached to the machines in locations which provide adequate measurement of the desired physical characteristic. Such attachment is accomplished by means of a magnetic mount (as shown in FIG. 2) or other clamping means.

When a machine monitor 4 is initially supplied with power after attachment on the machine, the receive circuits of its transceiver 430 turn on and listen for a timing message from the command station 6. Since these timing messages are transmitted from the command station 6 at regular intervals of about ten seconds, the machine monitor 4 initially is powered on for no longer than about one such interval. After receipt of the timing message, the machine monitor computer 418 causes the receive circuits of the machine monitor transceiver 430 to be turned off, and sets the timer 424 to match the time of the command station computer clock as indicated by the timing message. During the appropriate time slot, the timing of which is a function of the machine monitor's identification code, the transmit circuits of the machine monitor transceiver 430 are turned on and a message is transmitted to the command station 6 verifying the error-free receipt of the timing message. The transmit circuits of the machine monitor transceiver 430 are then turned off until the next transmission time.

Alternatively, the synchronization of the command station clock with the machine monitor timer 424 may be accomplished prior to installation of the machine monitor 4 on the machine. Such synchronization may be done when the command station computer 612 transfers the initial programming to the machine monitor computer 418 via the interface cable.

Next, the receive circuits of the machine monitor transceiver 430 are turned on to listen for further messages from the command station 6. These messages tell the machine monitor 4 when to "wake up" and listen for the next synchronization message from the command station 6, when to collect data from the sensor 408, how to analyze the data, and when to transmit the analyzed data to the command station 6. After the receipt and processing of these messages, the machine monitor computer 418 turns off the transceiver power and enters a low-power standby mode.

At the next designated time to take a sensor measurement, the timer 424 causes the machine monitor computer 418 to enter an operational mode. The computer 418 then turns on the sensor 408, collects the sensor data, converts the data to digital format, and turns the sensor 408 off. The machine monitor computer 418 performs the mathematical functions necessary to analyze the data according to its programmed instructions, and compares the analyzed data to a preprogrammed threshold criteria. If the analyzed data does not exceed the threshold criteria, the machine monitor computer 418 stores the analyzed data in memory 422 for later transmission to the command station 6. The machine monitor computer 418 then enters the standby mode to await the next scheduled measurement time or transmit time.

If the analyzed data exceeds the threshold criteria, the machine monitor computer 418 generates an alert message, and, at the next time slot assigned for alert transmissions, turns on the transmit circuits of the transceiver 430 and transmits the alert message and the analyzed data to the command station 6. After this transmission, the machine monitor computer 418 turns off the transmit circuits of the transceiver 430, turns on the receive circuits, and listens for a verification message from the command station 6. The command station 6 transmits the verification message after error-free receipt of the data from the machine monitor 4.

At the next regularly-scheduled transmit time, the machine monitor timer 424 causes the machine monitor computer 418 to wake-up from standby mode and enter an operational mode. The computer 420 then turns on the transmit circuits of the transceiver 430 and sends the analyzed data, which is stored in memory 422, to the transceiver 430 which transmits the analyzed data to the command station 6. The computer 420 then turns off the transmit circuits of the transceiver 430 and turns on the receive circuits which listen for a verification message from the command station 6. The command station 6 transmits the verification message after error-free receipt of the data from the machine monitor 4.

Between synchronization transmissions, the command station 6 is listening for data transmissions from the machine monitors 4. Upon receipt of a transmission from a machine monitor 4, the command station computer 612 determines, based on the received identification code, which machine monitor 4 is the source of the transmission, and stores the received data accordingly. This data may be stored for later analysis or may be displayed in real-time, such as in a graphical plot of vibration versus time.

Upon receipt of an alert message, the command station 6 notifies an operator and displays which machine monitor 4 is the source of the alert message. Based on the nature of the alert message, the operator may transmit further instructions from the command station 6 to the machine monitor 4 to carry out a different measurement or analysis operation, or the operator may take action to shut down the machine.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A wireless monitoring system for monitoring a plurality of machines, the system comprising:

a plurality of machine monitors mounted on a plurality of machine measuring points, each machine monitor including:

at least one sensor for sensing a characteristic of the machine at the machine measuring point and generating at least one sensor signal corresponding to the machine characteristic that was sensed;

a data processor for receiving and analyzing the sensor signals and producing analyzed sensor signals; and transmitter means for producing wireless transmission signals corresponding to the analyzed sensor signals; and a command station including receiver means for receiving said transmission signals and storing data corresponding to said transmission signals and the sensed characteristics of the machines, whereby characteristics of the plurality of machines at the plurality of measuring points are sensed and stored at said command station.

2. The system of claim 1 wherein at least one of said machine monitors further comprises a microcomputer for receiving and analyzing the sensor signals, producing frequency domain data corresponding to the sensor signals, comparing the frequency domain data to predetermined criteria and determining an alarm condition based on the comparing of the frequency domain data to the predetermined criteria.

3. The system of claim 2 wherein said microcomputer performs a Fourier transform on the sensor signals to produce the frequency domain data in the form of a frequency spectrum.

4. The system of claim 1 wherein at least one of said machine monitors further comprises a microcomputer for receiving and analyzing the sensor signals, producing time wave form data corresponding to the sensor signals, comparing the time wave form data to predetermined criteria and determining an alarm condition based on the comparing of the time wave form data to the predetermined criteria.

5. The system of claim 1 wherein at least one of said machine monitors further comprises a memory for storing data corresponding to the analyzed sensor signals.

6. The system of claim 1 wherein at least one of said machine monitors further comprises a memory for storing data corresponding to the analyzed sensor signals, wherein the transmitter means of the at least one of said machine monitors produces wireless transmission signals corresponding to the stored data signals.

7. The system of claim 1 wherein at least one of said machine monitors further comprises a timer for selectively energizing and de-energizing the machine monitor sensor, data processor, and transmitter means.

8. The system of claim 1 wherein at least one of said machine monitors further comprises a wireless receiver means and said command station further comprises a wireless transmitter means for transmitting commands, said machine monitor receiving the commands through said wireless receiver means of said machine monitor and being responsive to said commands to control the operation of said machine monitor.

9. The system of claim 1 further comprising a wireless repeater for receiving the wireless transmission signals from said machine monitor and re-transmitting the wireless transmission signals for receipt by said command station.

10. The system of claim 1 wherein:
at least one of said machine monitors further comprises an analog-to-digital converter;
at least one of said data processors is a digital data processor for producing digital data corresponding to the sensor signals; and
at least one of said transmitter means produces wireless transmission signals corresponding to the digital data signals.

11. The system of claim 1 wherein:
at least one of said machine monitors further comprises an analog-to-digital converter;
at least one of said data processors is a digital data processor for producing digital data corresponding to the sensor signals; and
at least one of said transmitter means produces wireless transmission signals corresponding to the digital data signals; and
said command station further comprises receiver means for receiving the wireless digital transmission signals.

12. The system of claim 1 wherein:
at least one of said machine monitors further comprises an analog-to-digital converter;
at least one of said data processors is a digital data processor for producing digital data corresponding to the sensor signals;
at least one of said transmitters means produces wireless transmission signals corresponding to the digital data signals;
said command station further comprises receiver means for receiving the digital transmission signal and transmitter means for transmitting wireless command signals;
said at least one machine monitor further comprises receiver means for receiving said command signals; and
said digital data processor being responsive to said command signals to control the operation of the machine monitor.

13. The system of claim 12 further comprising each of said transmitter means and receiver means transmitting and receiving a digital signal with an error checking protocol.

14. The system of claim 1 further comprising said transmitter means and receiver means transmitting and receiving a digital signal, respectively, with an error checking protocol.

15. The system of claim 1 wherein said transmitter means further comprise radio frequency transmitter means and said receiver means further comprise radio frequency receiver means.

16. The system of claim 8 wherein said transmitter means further comprise radio frequency transmitter means and said receiver means further comprise radio frequency receiver means.

17. The system of claim 1 wherein said transmitter means further comprise spread spectrum transmitter means and said receiver means further comprise spread spectrum receiver means, each using a spread spectrum communication protocol to avoid interference from other radio frequency emitters.

18. The system of claim 8 wherein said transmitter means further comprise spread spectrum transmitter means and said receiver means further comprise spread spectrum receiver means, each using a spread spectrum communication protocol to avoid interference from other radio frequency emitters.

19. The system of claim 1 wherein said transmitter means further comprise light wave transmitter means and said receiver means further comprise light wave receiver means.

20. The system of claim 8 wherein said transmitter means further comprise light wave transmitter means and said receiver means further comprise light wave receiver means.

21. The system of claim 1 further comprising;
an identification system incorporated into each machine monitor for storing and generating a unique identification code for each machine monitor, said identification code being transmitted by said transmitter means as part of said wireless transmission signals; and
said command station being responsive to the identification code to identify positively which machine monitor transmitted a particular received wireless transmission signal.

22. The system of claim 1 further comprising a timer system for powering on said sensor, data processor, and transmitter means at the selected times, and powering off said sensor, data processor, and transmitter means at other times to reduce power consumption by said sensor, data processor, and transmitter means.

23. The system of claim 9 further comprising a timer system for producing start-up signals at selected times for causing said sensor, analog to digital converter, data processor, transmitter means and receiver means of said at least one machine monitor to power on at the selected times for transmitting and receiving signals at the selected times and power off at other times to reduce power consumption.

24. The system of claim 1 further comprising:
   a clock in at least one machine monitor for producing clock signals corresponding to time;
   said data processor in at least one machine monitor being responsive to said clock signals for producing start-up signals at selected times in response in part to said clock signals, and for producing shut-down signals,
   said sensor and transmitter means of said at least one machine monitor being responsive to said start-up signals to power on, sense the machine characteristic, generate the sensor signals corresponding to the machine characteristic, and transmit the sensor signals at the selected times, and being responsive to said shut-down signals to power off at other times to reduce power consumption by said sensor and transmitter means.

25. The system of claim 1 further comprising:
   a clock in at least one machine monitor for producing clock signals corresponding to time;
   said data processor in said at least one machine monitor being responsive to said clock signals for producing start-up signals at selected times in response in part to said clock signals, for producing shut-down signals at other times, and for producing data corresponding to the analyzed sensor signals;
   memory in said at least one machine monitor controlled by said data processor for storing data corresponding to the analyzed sensor signals;
   said at least one sensor of said at least one machine monitor being responsive to said start-up signals to power on at the selected times and sense a machine characteristic and produce sensor signals corresponding to the sensed machine characteristic, and being responsive to said shut-down signals to power off at the other times to reduce power consumption by said sensor;
   said transmitter means of said at least one machine monitor being responsive to said start-up signals to power on at the selected times and produce wireless transmission signals corresponding to the stored data signals, and being responsive to said shut-down signals to power off at the other times to reduce power consumption by said transmitter means.

26. The system of claim 1 wherein each of said machine monitors is mounted within a housing sufficiently small, having dimensions of about two inches by two inches by three inches, to be mounted unobtrusively on machines.

27. The system of claim 1 wherein each of said machine monitors further comprises:
   a relatively small housing for being mounted on a machine;
   attachment means for attaching the housing to said machine;
   a battery of sufficiently small size to be disposed within said housing, and having sufficient capacity to power said sensor, data processor, and transmitter means for a time period of about a year; and
   mounting means for mounting each element of the machine monitor within said housing.

28. The system of claim 1 wherein said data processor of at least one of said machine monitors receives and analyzes the sensor signals, produces analyzed signals, compares the analyzed signals to predetermined criteria, and determines an alarm condition based on the comparing of the analyzed signals to the predetermined criteria.

29. The system of claim 28 wherein said at least one of said machine monitors further comprises:
   said data processor for producing a start-up signal, alarm data, and an alarm transmit signal when an alarm condition is determined to exist; and
   said transmitter means for said at least one machine monitor being responsive to said start-up signal to power on, and being responsive to said alarm transmit signal to transmit a wireless transmission signal corresponding to said alarm data.

30. The system of claim 29 wherein said transmitter means for said at least one machine monitor is responsive to said alarm transmit signal to produce a transmission signal that is different from other wireless transmission signals produced by the transmitter means of other machine monitors so that interference is avoided.

31. The system of claim 29 wherein said transmitter means for said at least one machine monitor is responsive to said alarm transmit signal to produce a transmission signal that has a different frequency range from the other wireless transmission signals produced by the transmitter means of other machine monitors so that interference is avoided.

32. The system of claim 29 wherein said transmitter means for said at least one monitor is responsive to said alarm transmit signal to produce a transmission signal at different times as compared to the other wireless transmission signals produced by the transmitter means of other machine monitors so that interference is avoided.

33. The system of claim 1 wherein said at least one sensor comprises a plurality of sensors producing a plurality of sensor signals, corresponding to a plurality of machine characteristics.

34. The system of claim 33 wherein one said sensors is a vibration sensor.

35. The system of claim 33 wherein one of said sensors is a temperature sensor.

36. A monitoring system for monitoring a machine, comprising:
   a monitor including the following elements:
      at least one sensor for sensing a physical characteristic of said machine at a machine measuring point and generating at least one analog sensor signal corresponding to the physical characteristic that was sensed;
      an analog to digital converter for producing digital sensor signals corresponding to said analog sensor signals;
      a monitor computer for receiving the digital sensor signals, analyzing the digital sensor signals and producing analyzed sensor signals, storing and producing data corresponding to the analyzed sensor signals, and producing messages;
      monitor wireless transmitter means responsive to the messages for producing monitor wireless transmission signals corresponding to the analyzed sensor signals;
      monitor receiver means for receiving wireless signals and producing received signals for being transferred to said monitor computer;

a power supply; and a housing for mounting on the machine and housing at least some of the monitor elements; and a command station including the following elements:

command station receiver means for receiving and transferring said monitor wireless transmission signals and transferring data corresponding to the received signals to a command station computer;

a command station computer for receiving and storing data corresponding to the received signals producing data, and producing commands; and command station transmitter means for transmitting command wireless transmission signals corresponding to data and commands received from said command station computer.

37. The system of claim 36 further comprising:

said command station for producing and transmitting scheduling commands corresponding to the time of day that the monitor transmitter means should start-up and transmit data;

said monitor receiver means receiving and transferring said scheduling commands to said monitor computer;

said monitor computer being responsive to said scheduling commands to issue start-up signals at selected times corresponding to the scheduling commands; and said monitor transmitter means being responsive to the start-up signals to power on and, under control of said monitor computer, produce monitor wireless transmission signals.

38. The system of claim 37 further comprising said monitor receiver means being responsive to the start-up signals to power on and, under control of said monitor computer, receive wireless signals and produce received data for transfer to said monitor computer.

39. The system of claim 38 further comprising:

said monitor computer for transferring data to said monitor transmitter means for being transmitted, for monitoring the transmission of said data, and for producing shut-down commands after the successful transmission of said data; and said monitor transmitter means being operable to transmit monitor wireless signals corresponding to said data and being responsive to the shut-down signal to power off to conserve power.

40. The system of claim 39 further comprising said monitor receiver means being responsive to said shut-down signal to power off to conserve power.

41. The system of claim 36 further comprising:

at least two monitors of claim 36, each of said monitors further comprising:

said monitor computer having a stored identification code identifying the monitor and distinguishing it from others, and producing identification signals for transfer to said monitor transmitter means; and said monitor transmitter means for transmitting identification wireless signals corresponding to said identification code;

said command station receiver means for receiving said identification wireless signals and transferring the identification code to said command station computer;

said command station computer being operable to identify a monitor based on said identification code.

42. The system of claim 41 further comprising:

said command station computer being operable to generate identification codes as part of a data packet and producing data packet signals for transfer to said command station transmitter means;

said command station transmitter means being operable to transmit data packet wireless signals corresponding to the data packet;

said monitor receiver means being operable to receive the data packet wireless signals and transfer data packets to said monitor computers;

each of said monitor computers, having a unique internal identification code, for comparing and determining whether the data packet identification code is the same as the internal identification code, responding in a first manner when said internal code and packet code are the same, and responding in a second manner when said internal code and packet code are not the same.

\* \* \* \* \*